S. H. JOHNSON.
MANUFACTURE OF GLUCOSE.
No. 186,935.  Patented Feb. 6, 1877.
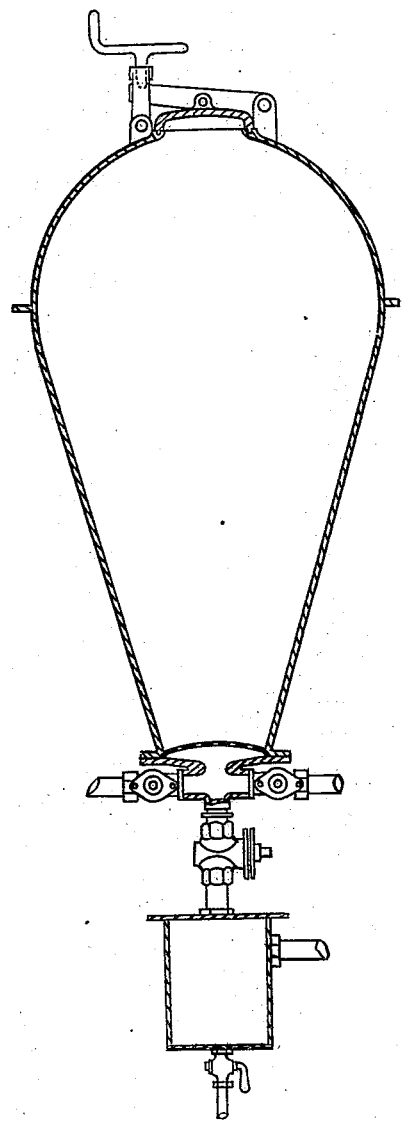
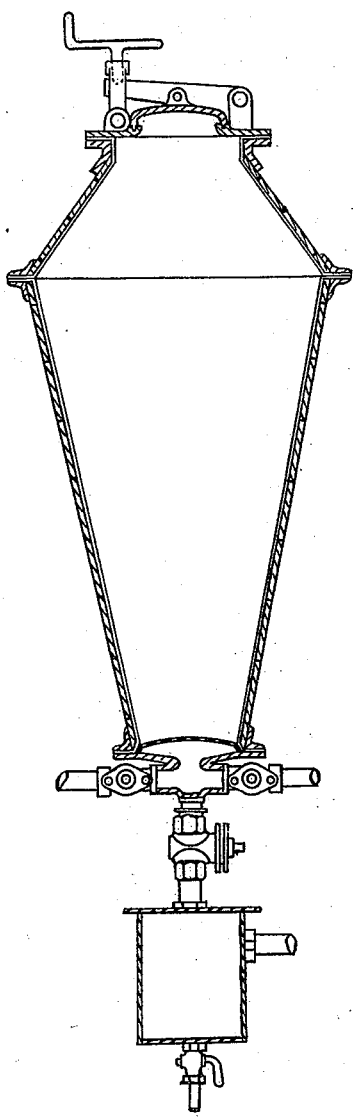
WITNESSES:
Wm A. Skinkle
Henry T. Earnest
INVENTOR:
Samuel H Johnson
By his Attorney
Wm D. Baldwin

UNITED STATES PATENT OFFICE.

SAMUEL HENRY JOHNSON, OF STRATFORD, ENGLAND.

IMPROVEMENT IN THE MANUFACTURE OF GLUCOSE.

Specification forming part of Letters Patent No. 186,935, dated February 6, 1877; application filed May 31, 1876.

*To all whom it may concern:*

Be it known that I, SAMUEL HENRY JOHNSON, of Lea Bank Works, Warton Road, Stratford, in the county of Essex, England, have invented new and useful Improvements in the Method of and Apparatus for the Manufacture of Glucose, which improvement is fully set forth in the following specification, reference being had to the accompanying drawings.

This invention has for its object the manufacture of glucose from "permeable" grain, the purification thereof by the means hereinafter described, and improvements in the apparatus to be employed therein.

Where the term "permeable" grain is mentioned it must be understood to include grain, whole, crushed, bruised, or broken, or granular amylaceous substances, being of such form and combined with only so small a proportion of water or liquid that steam can permeate every part of a layer or bed of it with facility. It being an essential feature in my invention that complete permeation of the steam should be effected, whole grain is generally preferred in this process; but in some cases it may be more convenient or cheaper to employ broken grain. The grain, however, must not be in the form of flour, as it would then form a paste more or less gelatinous, and so prevent complete permeation of the steam.

For the purpose of this invention rice or other grain containing starch may be employed, provided it be kept in a permeable condition, so as to allow steam to penetrate and act upon it until the starchy portion of all the grain becomes converted into dextrine. In all processes with which I am acquainted that have been heretofore proposed to be used, the grain operated upon has been treated with so much water as to allow of the starch to become so gelatinous and expand so much as to form a paste more or less impermeable to steam. This inconvenience I take care to avoid, and I proceed as follows: The grain is first macerated in a wooden vat or other suitable receptacle, with as much diluted hydrochloric acid containing about two per cent. of real acid as is necessary to cover the grain completely with the liquid. Other acids may be employed as hereinafter described. When the grain has absorbed as much as possible of the dilute acid, I draw off the liquid which remains unabsorbed by withdrawing a plug from a hole in the bottom of the vat, or by other suitable means, but so as that by the interposition of a filter or diaphragm the grain shall be prevented from flowing away with the liquid.

The dilute acid which has been drawn off from the grain will be found to have increased considerably in specific gravity, due to the proteine and albuminoid compounds which have become dissolved in it from the grain. It will have also acquired an aromatic odor, due to the essential oil removed from the grain by this treatment.

In order the more completely to remove the nitrogenous principles and the essential oils which still remain in the grain, I macerate it with clean water, in such a manner as that when the grain has become covered with the water the liquid is allowed to flow off at the bottom of the vat through an aperture provided with a filtering-diaphragm. The water is supplied at the top at the same rate as the liquid percolates through the grain. This percolation is continued until the liquid running away from the grain no longer gives an acid reaction to litmus-paper. When this neutral condition is attained, the grain is allowed to drain, and it is afterward again macerated for a few hours in dilute hydrochloric acid containing one or two per cent. of real acid. This maceration is continued until there is a dialysis of the acid through the tissues of the grain to such an extent that it will contain enough acid to effect its conversion into glucose when treated by the method hereinafter mentioned.

The proportion of acid varies according to the nature of the grain, the temperature at which the conversion is effected, and the amount of water present at the time of the conversion. Rice, for example, ordinarily requires about one four-hundredth part of its weight, when dry, of real hydrochloric acid to be present in the grain to effect the conversion under the circumstances and conditions of temperature and moisture that would obtain with it when treated as herein described; but the amount of acid necessary for conversion varies with different grains, and with different samples of the same species of grain. It is therefore necessary, when treating a particular lot of grain, to ascertain by experiment the least proportion of acid which, under all circumstances, it would be most desirable to employ, and so as that during the process of conversion the grain shall not be exposed to the high temperature necessary for such a length of time as would materially affect the color of the resulting product.

The grain, when prepared as above described, and well drained, is introduced into a strong wrought-iron vessel, lined with lead or with a silicate enamel, capable of resisting the action of the acid; or the vessel may be made of gun-metal, and in such case it need not be lined with lead. Such a vessel is represented on Figure 1 of the annexed drawings. The vessel should be of such a shape that when steam is introduted through a perforated diaphragm at the bottom it shall be able to pass with facility through every part of the material contained in the vessel. For this purpose I form the lower portion of the vessel in the shape of an inverted truncated cone, the whole area of the small truncated portion being covered internally by a perforated diaphragm for the admission of steam. This vessel is further provided with a suitable opening at the top for the introduction of the prepared grain, which opening is capable of being hermetically closed. It is also provided with a steam-pressure gage, and a draw-off cock and sampling-cock, connected beneath the perforated diaphragm before mentioned. There is also at the bottom a trap or small box to receive and retain any water which may be brought over by the steam. When such vessel is formed of wrought or cast iron lined with lead, (such a vessel is represented on Fig. 2 of the drawings,) it becomes necessary to perforate the iron at intervals with small holes, so as to prevent the accumulation of steam in case any moisture or dampness existed between the shell and the lead lining. Such accumulation of steam would inevitably occur in the absence of the precaution indicated, and when the contents of the vessel were removed, thus withdrawing the internal pressure, the leaden lining would collapse.

When the prepared grain is introduced into the vessel it still retains its form, and the mass is consequently quite porous, so that the steam introduced beneath the perforated diaphragm at the bottom of the vessel immediately permeates every portion of the material under operation, and owing to the form of the vessel, and the porous condition of the grain, the temperature of the mass is speedily raised without the aid of a mechanical agitator to the point at which the conversion into glucose takes place, the requisite degree of temperature being reached before a sufficient quantity of water has been formed by the condensation of the steam to destroy the porous nature of the grain under operation. When this point is attained the contents of the vessel become liquid, and are put into a state of violent agitation by the ingoing current of steam. The pressure under which such steam is introduced should not be less than fifty pounds nor more than one hundred pounds to the square inch, although lower pressures can be employed; yet it is not at all advantageous to use them. The pressure is varied between these limits, according to the nature of the grain employed, or the required character of the resulting product. For example, if it be desired that the product should retain a certain amount of dextrine, then a lower pressure would be employed than that which would be necessary for the complete conversion of the grain into glucose.

The mass may be sampled during the process by means of the sample-cock, and after dilution and cooling the samples may be tested for the presence of starch and dextrine by means of an aqueous solution of iodine.

When the conversion is completed, which, for rice, requires from five to fifteen minutes, (provided the steam has been injected with sufficient rapidity,) the contents of the vessel are forced out through the draw-off cock into large shallow coolers provided with suitable agitators, or into other suitable apparatus for reducing the temperature with rapidity. In these coolers the material is neutralized with an alkali or alkaline earth, or their carbonates, in the usual way.

If the product is required for the purpose of brewing or distilling, then the presence of the extraneous tissue, &c., is of little consequence. In such case the sirup may be at once boiled down in a vacuum-pan to the degree of concentration necessary for its solidification. It is found that glucose so obtained is free from the unpleasant bitter taste of fusel-oil, which is eliminated by the hydrochloric-acid treatment in the first stage of the process.

Hitherto, in order to remove this taste, it has been found necessary to filter the glucose through animal charcoal; but such filtration for this purpose is rendered unnecessary by this process. The sirup is also produced in such a degree of concentration as has hitherto been found impracticable.

When it is required to separate the glucose from the insoluble matter accompanying it, it will be necessary to dilute the sirup after neutralization, and filter it by any convenient method, whether under pressure or otherwise.

If it be desired to produce glucose free from color, it will be necessary to filter it through animal charcoal; but it will be found that after the treatment which I have described a much smaller proportion of animal charcoal will be required than has hitherto been the case.

For the purpose of removing the fusel-oil and nitrogenous substances, some other acids may be employed in lieu of hydrochloric acid, such as nitric and sulphuric acids; but hydrochloric acid answers the purpose best. The hydrocloric acid may be employed in the gaseous state, and may also be replaced by nitric and sulphuric acids, for the purpose of conversion; but a solution of hydrochloric acid is the most powerful and convenient, and effects the conversion with the smallest amount of coloration. Where hydrochloric acid is used, the quantity necessary is so small that the common salt produced by neutralization with carbonate of soda remaining in the glucose is of no material consequence.

Before macerating the grain with dilute hydrochloric acid, for the purpose of removing impurities, I sometimes precede that treatment with a maceration in a solution of caustic soda or other alkali, for the purpose of more perfectly removing the nitrogenous portion of the grain. The alkali solution should contain one-half to one per cent., or more, of alkali, according to the amount of nitrogenous substances in the grain. After macerating a sufficient time, say five or six hours, I remove the alkaline solution, which has dissolved in it a considerable portion of the gluten of the grain, and I wash out the alkali in the same manner as described herein in reference to the acid treatment. I then proceed with the acid treatment, as hereinbefore described.

When it is desired to produce glucose or dextrine at the cheapest possible rate for brewing or distilling purposes, or where it is desired to use amylaceous matters, such as sago, tapioca, &c., which have already undergone purification processes, for the purpose of freeing the starch from albuminous matter, I omit the purification processes preceding the conversion and adopt the following plan, which I hereafter call my modified process: I treat the grain in a revolving or other suitable vessel, which procures the proper mixing of the grain, with about four per cent. of its weight of dilute hydrochloric acid, of specific gravity about 1.060, until the acid is absorbed by the grain. After the acid has been allowed to remain in contact with the grain for the time necessary for the disintegration of the tissues, the mass may then, after draining to completely remove from the mass all unabsorbed acid, be treated in the converter in the manner hereinbefore described, when it will be found that after expulsion from the converter, neutralizing and cooling, the mass will become solid, or nearly so, provided the grain employed for the purpose did not contain an undue amount of water. In such latter case the excess of water above what is necessary for the conversion should be expelled by heat from the grain before it is employed for the purpose by means of a kiln or other convenient apparatus.

In order to reduce the quantity of water to the smallest possible proportion, it is desirable that the neutralization of the acid should be effected with dry re-agents. For this purpose, in the case of the employment of hydrochloric acid, I prefer to use dry carbonate of soda; but when I employ sulphuric acid I prefer dry carbonate of lime. By this modified method I am enabled to produce glucose, or mixtures of glucose and dextrine, from normal rice in such a state of concentration that after cooling with agitation to facilitate the evaporation of the water the mass becomes solid, or nearly so, whereby the expense of evaporation is saved, and the prejudicial effect of heat on the color of the resulting product is avoided.

When it is desired—for distilling purposes, for instance—that the product shall consist almost entirely of glucose, I then effect the conversion as hereinbefore described; but before removing the material from the converter I introduce into it a quantity of water or very dilute acid, which, by experiment, is found to be sufficient for the grain employed, and which has been previously heated under pressure to the temperature of the contents of the converting-vessel, and maintain it at this temperature until the desired result is obtained, which is determined by trial during the progress of the operation. In this second or modified process, as in the first, the proportion or description of acid must be varied, according to the nature of the grain operated upon, the most convenient proportion having been previously determined by experiment, and all unabsorbed dilute acid removed before the mass is placed in the converting-vessel.

Having thus described the nature of my invention, and the manner of performing the same, I would have it understood that I claim as my improvements in the manufacture of, and apparatus for the manufacture of, glucose—

1. The hereinbefore-described method of treating grain in the manufacture of glucose, which consists in macerating with dilute acid, as specified, drawing off the unabsorbed acid, macerating the material with clean water, again macerating in dilute acid, and then drawing off all unabsorbed acid preparatory to treatment in a converter.

2. The hereinbefore-described method of treating grain in the manufacture of glucose preparatory to treatment in the converter, which consists in macerating the grain with an alkaline solution, drawing off the unabsorbed solution, washing the grain with water, macerating with dilute acid, as specified, drawing off the unabsorbed dilute acid, again washing with water, and again treating with acid, substantially in the manner described.

3. The hereinbefore-described method of treating grain in the manufacture of glucose, which consists in macerating the grain with dilute acid, as specified, drawing off the surplus acid from the grain, washing with water, again thoroughly impregnating the grain with acid, introducing the grain, with such acid only as is absorbed thereby, into a converter having a perforated bottom or diaphragm, above which the grain is supported, admitting steam under pressure through said diaphragm, and thereby speedily raising the temperature of the mass (before a sufficient quantity of water has been formed to destroy the porous condition of the mass and prevent the access of the steam to all parts thereof) to the point at which conversion takes place, and finally forcing out the contents of the converter.

4. The hereinbefore-described method of treating grain in the converter in the manufacture of glucose, which consists in submitting grain thoroughly impregnated with dilute acid, but with only such acid as is absorbed thereby, to the direct action of steam under considerable pressure, substantially in the manner described, whereby the entire mass of grain is simultaneously acted upon, and the point at which conversion takes place is attained before the formation of sufficient water to prevent the free access of the steam to all parts of the grain.

SAMUEL HENRY JOHNSON.

Witnesses:
   JOHN DEAN,
   THOMAS LAKE,
Both of No. 17 Gracechurch Street, London, E. C.